(12) United States Patent
Tak et al.

(10) Patent No.: US 7,379,142 B2
(45) Date of Patent: May 27, 2008

(54) LIQUID CRYSTAL DISPLAY

(75) Inventors: Young-Mi Tak, Seoul (KR); Ae Shin, Cheongju-si (KR); Dong-Gyu Kim, Yongin-si (KR); Seung-Soo Baek, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 3 days.

(21) Appl. No.: 11/523,302

(22) Filed: Sep. 19, 2006

(65) Prior Publication Data

US 2007/0008475 A1    Jan. 11, 2007

Related U.S. Application Data

(63) Continuation of application No. 10/844,239, filed on May 12, 2004, now Pat. No. 7,110,075.

(30) Foreign Application Priority Data

May 13, 2003    (KR)    .......................... 10-2003-30195

(51) Int. Cl.
*G02F 1/1337*    (2006.01)
(52) U.S. Cl. ..................................... 349/129
(58) Field of Classification Search ........ 349/142–146, 349/129, 192
See application file for complete search history.

(56) References Cited

U.S. PATENT DOCUMENTS

2002/0145695 A1*  10/2002  Kim et al. .................. 349/141
2003/0011729 A1    1/2003  Song et al.

FOREIGN PATENT DOCUMENTS

CN    1251914    5/2000

* cited by examiner

*Primary Examiner*—David Nelms
*Assistant Examiner*—Phu Vu
(74) *Attorney, Agent, or Firm*—F. Chau & Associates, LLC (57) ABSTRACT

A liquid crystal display is provided, which includes: a first substrate; a first signal line formed on the first substrate; a second signal line formed on the first substrate and intersecting the first signal line; a pixel electrode including a plurality of partitions; a thin film transistor connected to the gate line, the data line, and the pixel electrode; a second substrate facing the second substrate; a common electrode formed on the second substrate and having an opening facing the first or the second signal line; and first and second domain defining members that define a plurality of domains in the liquid crystal display and are dispose on the first and the second substrates, respectively, the second domain defining member disposed on the second substrate and separated from the opening.

12 Claims, 6 Drawing Sheets

LIQUID CRYSTAL DISPLAY

CROSS-REFERENCE TO RELATED APPLICATION

This application is a continuation of application Ser. No. 10/844,239, filed on May 12, 2004, now U.S. Pat. No. 7,110,075 which claims priority to Korean Patent Application No. 2003-30195, filed on May 13, 2003, the disclosure of which in its entirety is incorporated by reference herein.

BACKGROUND OF THE INVENTION (a) Field of the Invention

The present invention relates to a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the viewing angle is widened. In particular, a patterned VA (PVA) mode LCD employing the cutouts is preferred as a substitute of an in-plane switching (IPS) mode LCD.

The PVA mode LCD has a fast response time compared with a twisted nematic (TN) mode LCD since the motions of the LC molecules only include elastic splay or bend without twist.

In the meantime, the LCD also includes a plurality of switching elements for applying voltages to the field-generating electrodes and a plurality of signal lines such as gate lines and data lines connected to the switching elements. The signal lines make capacitive coupling with other signal lines and the common electrode, which serves as a load exerted on the signal lines to yield signal delay as well as their own resistances. In particular, the coupling between the data lines and the common electrode drives liquid crystal molecules disposed therebetween to cause light leakage near the data lines, thereby deteriorating the light leakage. In order to prevent the light leakage, a black matrix may be wide to reduce the aperture ratio.

SUMMARY OF THE INVENTION

A liquid crystal display is provided, which includes: a first substrate; a first signal line formed on the first substrate; a second signal line formed on the first substrate and intersecting the first signal line; a pixel electrode including a plurality of partitions; a thin film transistor connected to the gate line, the data line, and the pixel electrode; a second substrate facing the second substrate; a common electrode formed on the second substrate and having an opening facing the first or the second signal line; and first and second domain defining members that define a plurality of domains in the liquid crystal display and are dispose on the first and the second substrates, respectively, the second domain defining member disposed on the second substrate and separated from the opening.

The first domain defining member may include a first cutout provided at the pixel electrode and the second domain defining member may include a second cutout provided at the common electrode.

A distance between the second cutout and the opening preferably ranges from about three to six microns.

A liquid crystal display is provided, which includes: a first substrate; a gate line formed on the first substrate; a gate insulating layer formed on the gate line; a semiconductor layer formed on the gate insulating layer; a data line formed on the gate insulating layer and intersecting the gate line; a drain electrode formed on the semiconductor layer at least in part; a pixel electrode connected to the drain electrode and having a first cutout; a second substrate facing the first substrate; and a common electrode formed on the second substrate and having a second cutout facing the pixel electrode and a first opening that faces the gate line or the data line.

The liquid crystal display may further include a storage electrode line located on the same plane as the gate line and overlapping the pixel electrode.

The common electrode may further have a second opening separated from the first opening along the gate lines or the data line.

Distances between the second cutout and the first and the second openings and between the first opening and the second opening may range from about three to six microns.

The liquid crystal display may further include a plurality of ohmic contacts disposed between the semiconductor layer and the data line and between the semiconductor layer and the drain electrode.

The ohmic contacts and the semiconductor layer may extend along the data line and the drain electrode.

The semiconductor layer may have substantially the same planar shape as the data line and the drain electrode except for a portion disposed between the data line and the drain electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

Figure 1:
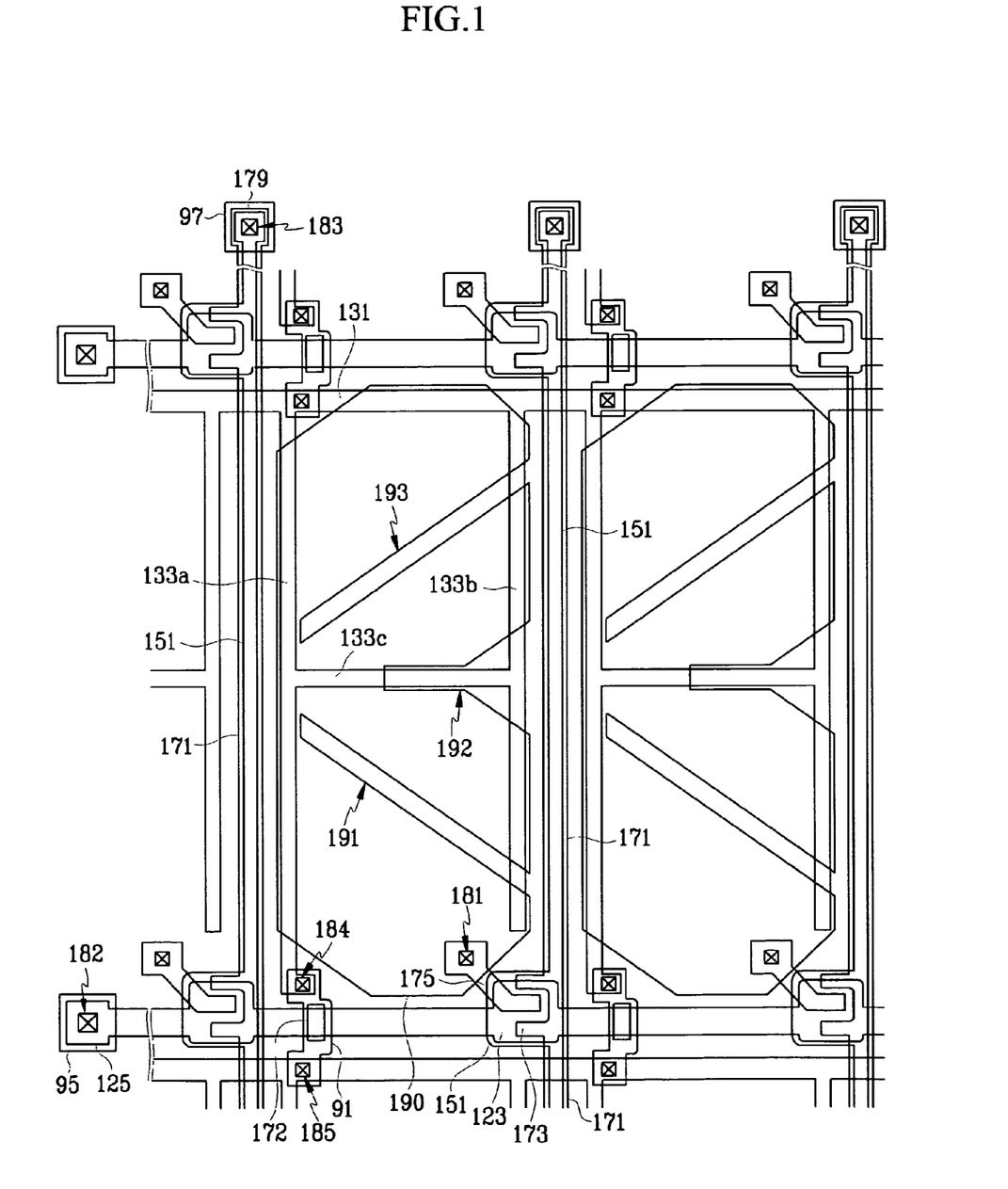
FIG. 1 is a layout view of a TFT array panel of an LCD according to an embodiment of the present invention.
Figure 2:
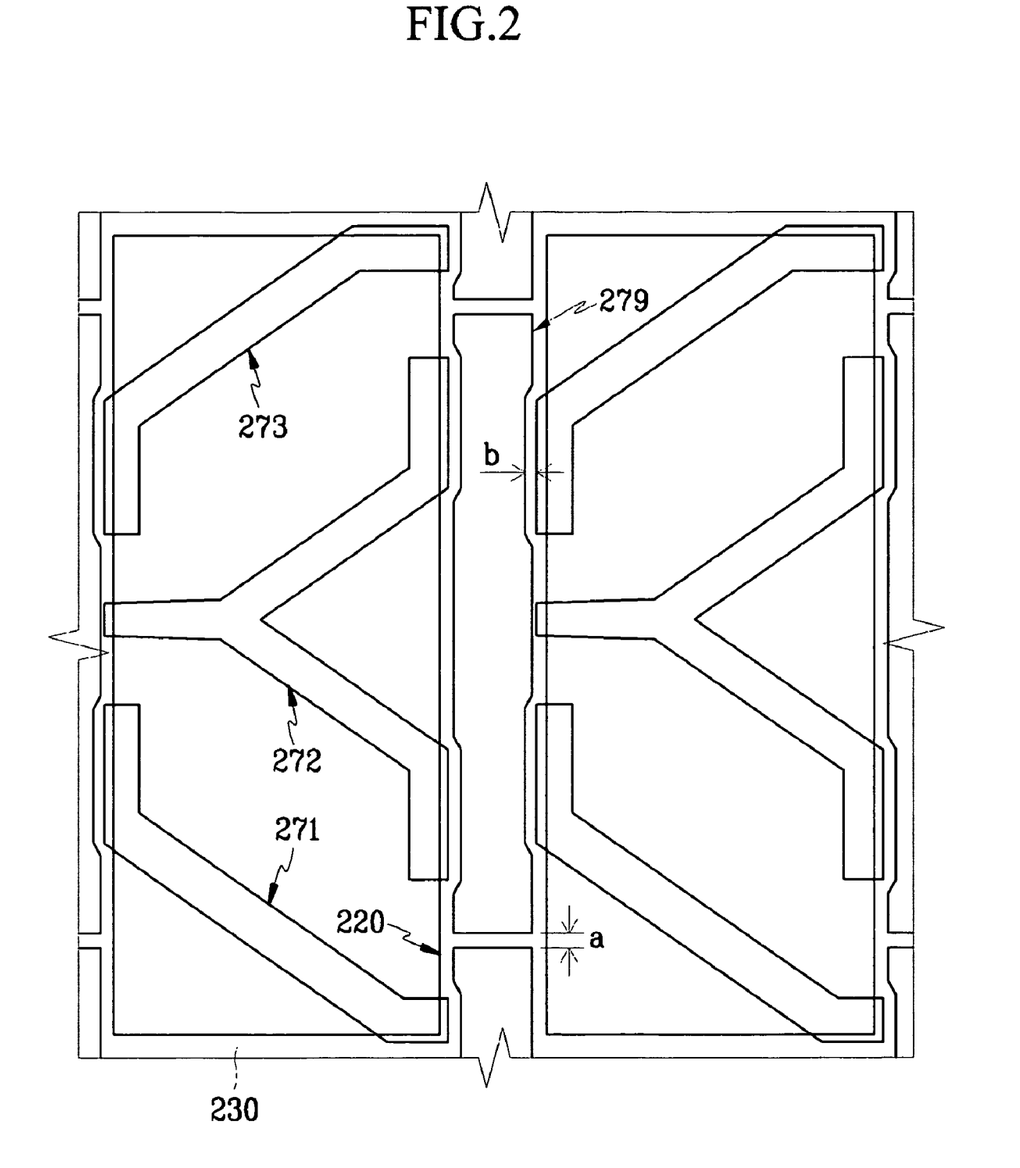
FIG. 2 is a layout view of cutouts of a common electrode panel of an LCD according to an embodiment of the present invention.
Figure 3:
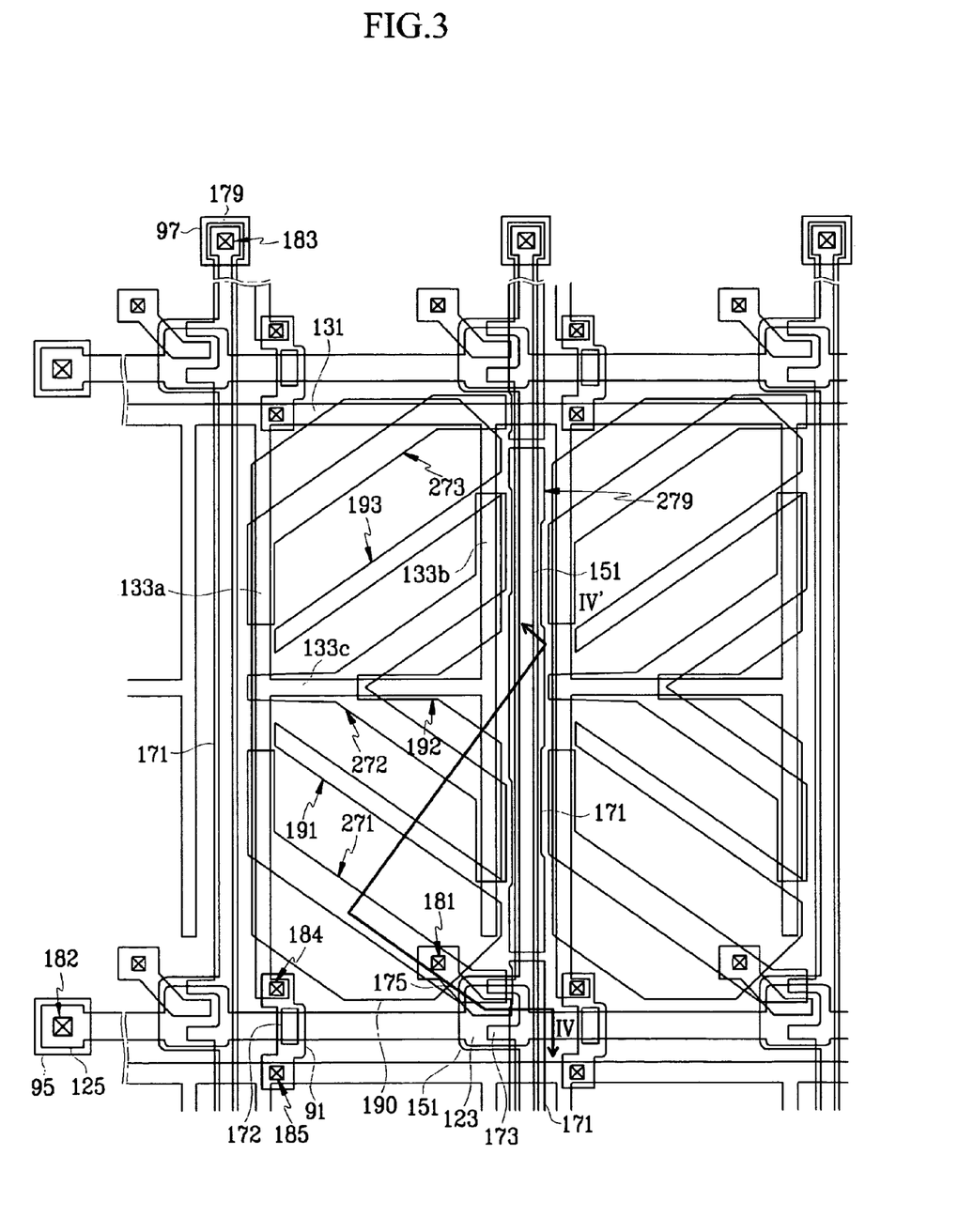
FIG. 3 is a layout view of an LCD including the TFT array panel shown in FIG. 1 and the common electrode panel shown in FIG. 2.
Figure 4:
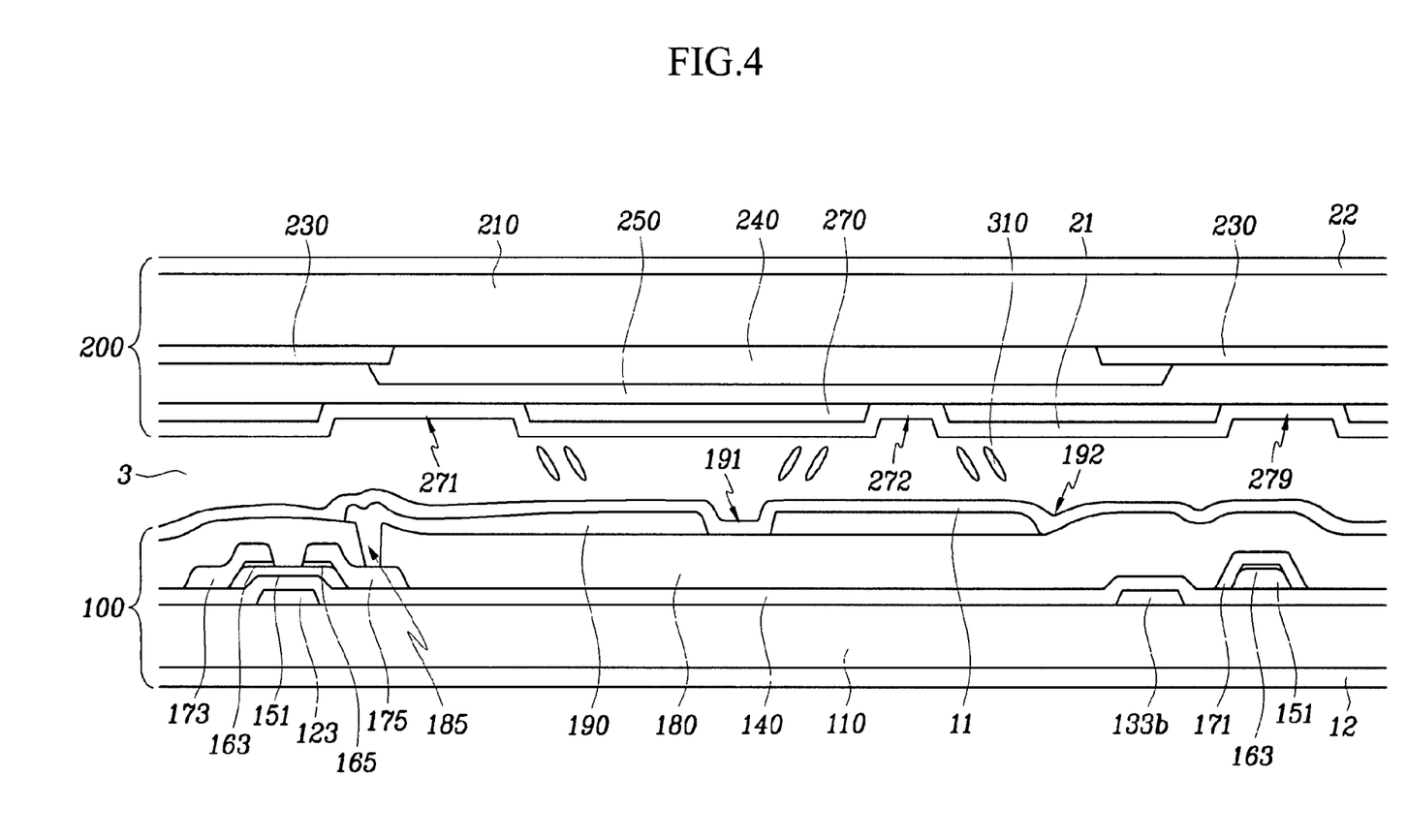
FIG. 4 is a sectional view of the LCD shown in FIG. 3 taken along the line IV-IV'.

FIG. 1 is a layout view of a TFT array panel of an LCD according to an embodiment of the present invention, FIG. 2 is a layout view of cutouts of a common electrode panel 200 of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV-IV'.

An LCD according to an embodiment of the present invention will be described in detail with reference to FIGS. 1-4.

FIG. 1 is a layout view of a TFT array panel of an LCD according to an embodiment of the present invention, FIG. 2 is a layout view of cutouts of a common electrode panel of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV-IV'.

An LCD according to an embodiment of the present invention includes a TFT array panel 100, a common electrode panel 200, and a LC layer 3 interposed between the panels 100 and 200 and containing a plurality of LC molecules aligned substantially vertical to surfaces of the panels 100 and 200.

The TFT array panel 100 is now described in detail with reference FIGS. 1, 3 and 4.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of projections forming a plurality of gate electrodes 123 and an end portion having a large area for connection with an external driving circuit.

Each storage electrode line 131 extends substantially in the transverse direction and includes a plurality of sets of two longitudinal branches forming first and second storage electrodes 133a and 133b and a transverse branch forming a third storage electrode 133c connected between the first storage electrode 133a and the second storage electrode 133b. Each of the first storage electrodes 133a has a free end portion and a fixed end portion connected to the storage electrode line 131, and the fixed end portion has a projection. Each of the third storage electrodes 133c forms a mid-line between two adjacent gate lines 121. The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multilayered structure including two films having different physical characteristics, a lower film (not shown) and an upper film (not shown). The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al—Nd alloy.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 123.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171, a plurality of drain electrodes 175 separated from the data lines 171, and a plurality of isolated metal pieces 172 are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 is disposed between the first and the second storage electrodes 133a and 133b in adjacent sets of the branches 133a-133c of the storage electrode lines 131 and it includes an end portion 179 having a large area for contact with another layer or an external device. A plurality of branches of each data line 171, which project toward the drain electrodes 175, form a plurality of source electrodes 173. Each drain electrode 175 includes an end portion 179 having a large area for contact with another layer and each source electrode 173 is curved to partly enclose another end portion of the drain electrode 175. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The metal pieces 172 are disposed on the gate lines 121 near the end portions of the storage electrodes 133a.

The data lines 171, the drain electrodes 175, and the metal pieces 172 are preferably made of refractory metal such as Cr, Mo containing metal, Ti and Ti, or Al containing metal and they may also have a multilayered structure including a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si: C:O and a-Si:O:F formed by plasma enhanced chemical vapor deposition (PECVD), or inorganic material such as silicon nitride.

The passivation layer 180 has a plurality of contact holes 181 and 183 exposing the end portions of the drain electrodes 175 and the end portions 179 of the data lines 171, respectively. The passivation layer 180 and the gate insulating layer 140 have a plurality of contact holes 182, 184 and 185 exposing the end portions 125 of the gate lines 121, the projections of the free end portions of the first storage electrodes 133a, and portions of the storage electrode lines 131 near the fixed end portions of the first storage electrodes 133a, respectively. The contact holes 181-185 have a shape of polygon or a circle, and sidewalls of the contact holes 181-185 are tapered. Each of the contact holes 182 and 183 exposing the end portions 125 and 179 preferably has an area ranging from about 0.5 mm×15 μm to about 2 mm×60 μm.

A plurality of pixel electrodes 190, a plurality of contact assistants 95 and 97, and a plurality of storage connections 91, which are preferably made of ITO or IZO, are formed on the passivation layer 180.

The pixel electrodes 190 are physically and electrically connected to the drain electrodes 175 through the contact holes 181 such that the pixel electrodes 190 receive the data voltages from the drain electrodes 175.

The pixel electrodes 190 supplied with the data voltages generate electric fields in cooperation with the common electrode 270, which reorient liquid crystal molecules in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133a-133c.

Each pixel electrode 190 is chamfered at its four corners and the chamfered edges of the pixel electrode 190 make an angle of about 45 degrees with the gate lines 121.

Each pixel electrode 190 has a lower cutout 191, a center cutout 192, and an upper cutout 193, which partition the pixel electrode 190 into a plurality of partitions. The cutouts 191, 192 and 193 substantially have an inversion symmetry with respect to a third storage electrode 133c.

The lower and the upper cutouts 191 and 193 obliquely extend approximately from a right edge of the pixel electrode 190 approximately to a left edge of the pixel electrode 190, and they are disposed at lower and upper halves of the pixel electrode 190, respectively, which can be divided by the third storage electrode 133c. The lower and the upper cutouts 191 and 193 make an angle of about 45 degrees to the gate lines 121, and they extend perpendicular to each other. The center cutout 192 extends along the third storage electrode 133c and has an inlet from the right edge of the pixel electrode 190, which has a pair of inclined edges substantially parallel to the lower cutout 191 and the upper cutout 193, respectively.

Accordingly, the lower half of the pixel electrode 190 is also partitioned into two lower partitions by the lower cutout 191 and the upper half of the pixel electrode 190 is partitioned into two upper partitions by the upper cutout 193. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

The contact assistants 95 and 97 are connected to the end portions 125 of the gate lines 121 and the end portions 179 of the data lines 171 through the contact holes 182 and 183, respectively. The contact assistants 95 and 97 are not requisites but preferred to protect the end portions 125 and 179 and to complement the adhesiveness of the end portions 125 and 179 and external devices.

The storage connections 91 cross over the gate lines 121 and they are connected to the exposed projection of the fixed end portions of the first storage electrodes 133a and the exposed portions of the storage electrode lines 131 respectively through the contact holes 184 and 185 opposite each other with respect to the gate lines 121. The storage connections 91 overlaps the metal pieces 172 and they may be electrically connected to the metal pieces 172. The storage electrode lines 131 including the storage electrodes 133a-133c along with the storage connections 91 and the metal pieces 172 are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the storage connections 91 by a laser beam to electrically connect the gate lines 121 to the storage connections 91. In this case, the metal pieces 172 enhance the electrical connection between the gate lines 121 and the storage connections 91.

The description of the common electrode panel 200 follows with reference to FIGS. 2-4.

A light blocking member 220 called a black matrix for preventing light leakage is formed on an insulating substrate 210 such as transparent glass. The light blocking member 220 may include a plurality of openings that face the partitions 191a and 191b of the pixel electrodes 191 and may have substantially the same shape as the partitions 191a and 191b. Otherwise, the light blocking member 220 may include oblique linear portions corresponding to the data lines 171 and other portions corresponding to the TFTs.

A plurality of red, green and blue color filters 230 are formed on the substrate 210 and they are disposed substantially in the areas enclosed by the light blocking member 220. The color filters 230 may extend substantially along the longitudinal direction along the pixel electrodes 191. The color filters 230 may represent one of the primary colors such as red, green and blue colors.

An overcoat 250 is formed on the color filters 230.

A common electrode 270 preferably made of transparent conductive material such as ITO and IZO is formed on the overcoat 250.

The common electrode 270 has a plurality of sets of cutouts 271-273 and a plurality of openings 279.

A set of cutouts 271-273 face a pixel electrode 190 and include a lower cutout 271, a center cutout 272, and an upper cutout 273. Each of the cutouts 271-273 is disposed between adjacent cutouts 191-193 of the pixel electrode 190 or between a cutout 191 or 193 and a chamfered edge of the pixel electrode 190. In addition, each of the cutouts 271-273 has at least an oblique portion extending parallel to the lower cutout 191 or the upper cutout 193 of the pixel electrode 190, and the distances between adjacent two of the cutouts 271-273 and 191-193, the oblique portions thereof, the oblique edges thereof, and the chamfered edges of the pixel electrode 190, which are parallel to each other, are substantially the same. The cutouts 271-293 substantially have an inversion symmetry with respect to a third storage electrode 133c.

Each of the lower and upper cutouts 271 and 273 includes an oblique portion extending approximately from a left edge of the pixel electrode 190 approximately to a lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center cutout 272 includes a central transverse portion extending approximately from the left edge along the third storage electrode 133c, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts 271-273 may be varied depending on the design factors, and the light blocking member 220 may also overlap the cutouts 271-273 to block the light leakage through the cutouts 271-273.

Each opening 279 extends along a data line 171 to overlap the data line 171 and it is disposed between adjacent sets of the cutouts 271-278. Some openings 279 meet the gate lines 121 while the other openings 279 do not meet the gate lines 121. The number of the openings 279 that are disposed between adjacent two gate lines 121 is one but it may be at least two.

The openings 279 reduce the load exerted on the data lines 171 and thus the delay of the data voltages flowing in the data lines 171, which is generated by the parasitic capacitance formed by the overlap of the common electrode 270 and the data lines 171. The reduction of the load on the data lines 171 enlarges the freedom of the selection of the material for the data lines 171 and the resolution of the LCD.

The openings 279 also decrease the variation of the capacitance of the liquid crystal capacitor due to the data voltages carried by the data lines 171, thereby decreasing vertical crosstalk that are firstly generated under the poor charging capacity of the liquid crystal capacitor. Accordingly, the charging capacity is improved.

In addition, the openings 279 reduce the lateral light leakage due to the lateral crosstalk of the data signals. The reduction of the lateral light leakage enables to decrease the width of the light blocking member 220, thereby increasing aperture ratio.

Referring to FIG. 2, the distance between the openings 279 denoted by (a) and the distance between the openings 279 and the cutouts 271-273 denoted by (b) are preferably larger than the resolution of an exposer used in photolithography process, and more preferably, they are equal to about 3-6 microns. The portions of the common electrode 270 between the openings 279 and between the openings 279 and the cutouts 271-273 form various signal paths for the common voltage.

Homeotropic alignment layers 21 and 22 are coated on inners surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film for compensating the retardation of the LC layer 3.

The LC molecules in the LC layer 3 are aligned such that their long axes are vertical to the surfaces of the panels 100 and 200. The liquid crystal layer 3 has negative dielectric anisotropy.

The cutouts 191-193 and 271-273 controls the tilt directions of the LC molecules in the LC layer 3. That is, the liquid crystal molecules in each region called domain defined by adjacent cutouts 191-193 and 271-273 or by the cutout 272 or 273 and the chamfered edge of the pixel electrode 190 are tilted in a direction perpendicular to the extension direction of the cutouts 191-193 and 271-273. It is apparent that the domains have two long edges extending substantially parallel to each other and making an angle of about 45 degrees with the gate line 121.

At lease one of the cutouts 191-193 and 271-273 can be substituted with protrusions or depressions.

The shapes and the arrangements of the cutouts 191-193 and 271-273 and the openings 279 may be modified. For example, the openings 279 may be formed along the gate lines 121 instead of the data lines 171.

A method of manufacturing the TFT array panel shown in FIGS. 1-4 according to an embodiment of the present invention will be now described in detail.

A conductive film preferably made of Cr or Mo alloy or Al are deposited and photo-etched to form a plurality of gate lines 121 including a plurality of gate electrodes 123 and end portions 125 and a plurality of storage electrode lines 131 including a plurality of storage electrodes 133a-133c.

After sequential deposition of a gate insulating layer 140, an intrinsic a-Si layer, and an extrinsic a-Si layer, the extrinsic a-Si layer and the intrinsic a-Si layer are photo-etched to form a plurality of extrinsic semiconductor stripes and a plurality of intrinsic semiconductor stripes 151 including a plurality of projections 154 on the gate insulating layer 140.

Subsequently, a conductive film preferably made of Cr or Mo alloy or Al are deposited and photo-etched to form a plurality of date lines 171 including a plurality of source electrodes 173 and end portions 179, a plurality of drain electrodes 175, and a plurality of metal pieces 172.

Thereafter, portions of the extrinsic semiconductor stripes, which are not covered with the data lines 171 and the drain electrodes 175, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

A passivation layer 180 is formed by chemical vapor deposition of a-Si:C:O or a-Si:O:F, by deposition of an inorganic insulator such as silicon nitride, or by coating of an organic insulator such as acrylic material. An a-Si:C:O film may be deposited by using a gas mixture containing source gases of $SiH(CH_3)_3$, $SiO_2(CH_3)_4$, $(SiH)_4O_4(CH)_4$ or $Si(C_2H_5O)_4$, oxidants of $N_2O$ or $O_2$, and Ar or He. An a-Si:O:F film may be deposited by using a gas mixture of $SiH_4$, $SiF_4$, $O_2$, etc., and $CF_4$ gas may be added as an additional source of fluorine.

The passivation layer 180 and the gate insulating layer 140 are photo-etched to form a plurality of contact holes 181-185 exposing the drain electrodes 175, the end portions 125 of the gate lines 121, the end portions 179 of the data lines 171, the storage electrodes 133a, and the storage electrode lines 131.

Finally, a plurality of pixel electrodes 190, a plurality of contact assistants 95 and 97, and a plurality of storage connections 91 are formed on the passivation layer 180 and on the exposed portions of the drain electrodes 175, the end portions 125 and 179, the storage electrodes 133a, and the storage electrode lines 131 by sputtering and photo-etching an IZO or ITO layer. The TFT array panel may be preheated with nitrogen gas before the IZO or ITO layer is deposited in order for preventing the formation of metal oxides on exposed portions of metal layers through the contact holes 181-185.

An LCD according to another embodiment of the present invention will be described in detail with reference to FIGS. 5 and 6.

Figure 5:
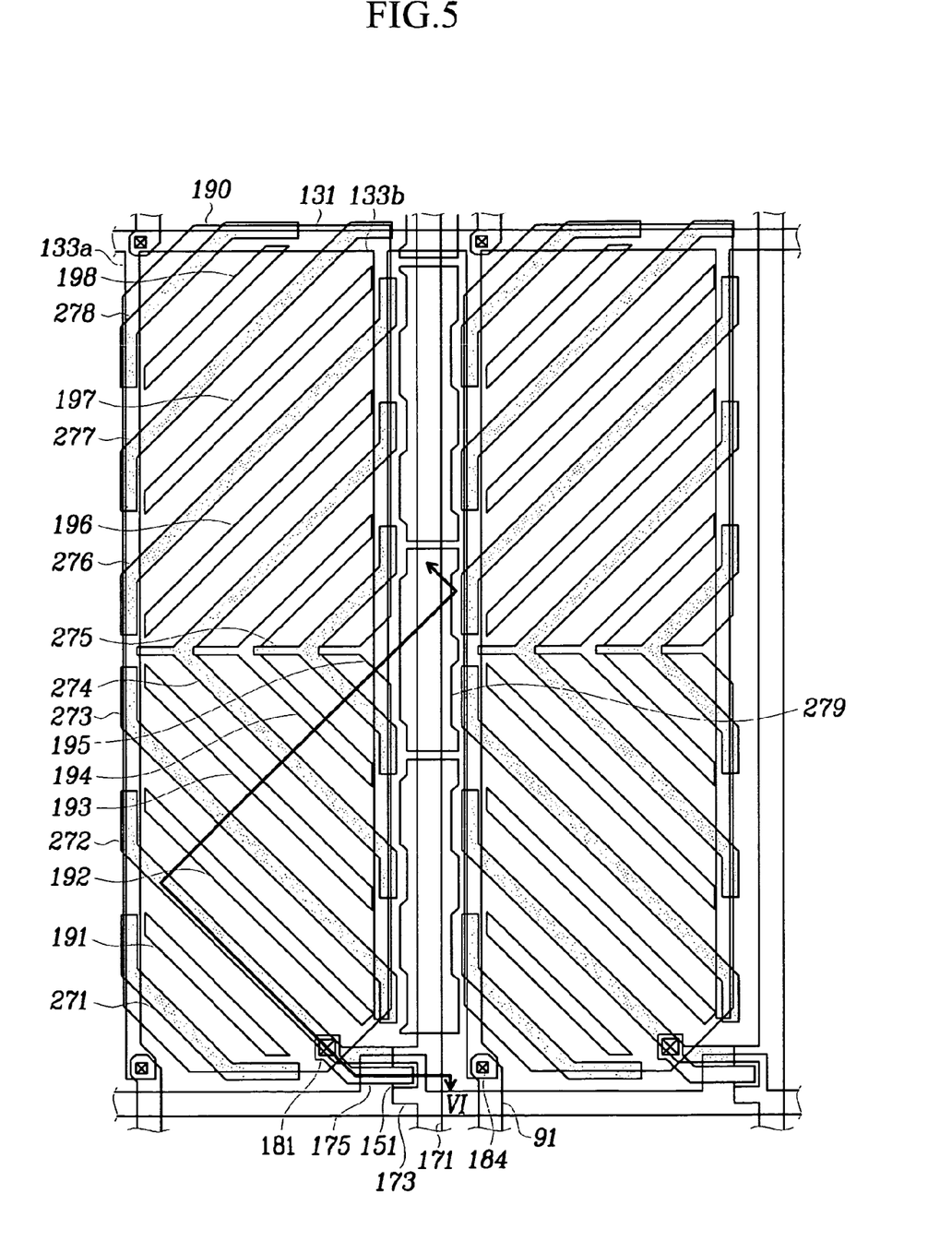
FIG. 5 is a layout view of an LCD according to another embodiment of the present invention.
Figure 6:
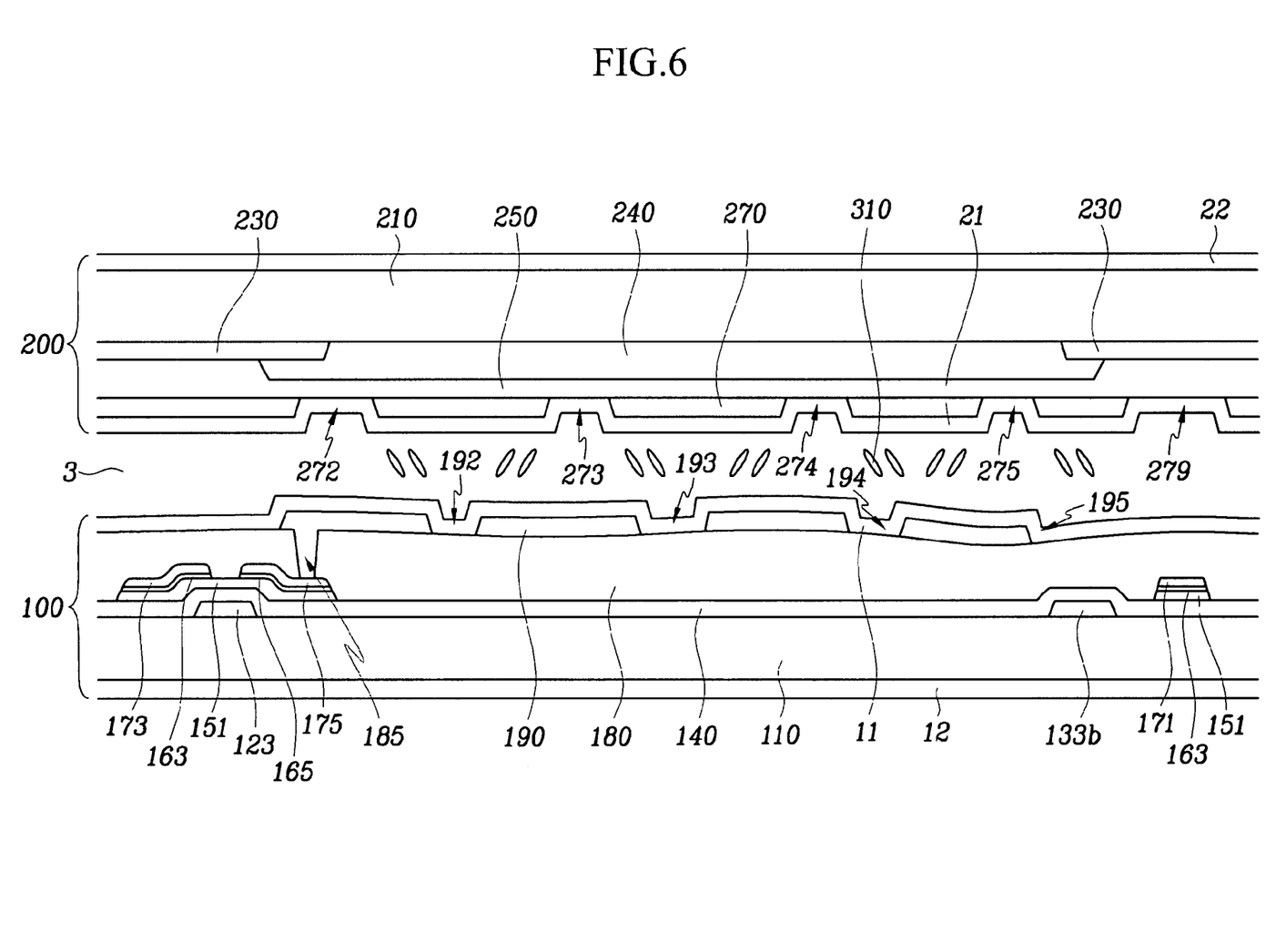
FIG. 6 is a sectional view of the LCD shown in FIG. 5 taken along the line VI-VI'.

FIG. 5 is a layout view of an LCD according to another embodiment of the present invention, and FIG. 6 is a sectional view of the LCD shown in FIG. 5 taken along the line VI-VI'.

Referring to FIGS. 5 and 6, an LCD according to this embodiment also includes a TFT array panel 100, a common electrode panel 200, and a LC layer 3 interposed therebetween.

Layered structures of the panels according to this embodiment are almost the same as those shown in FIGS. 1-4.

Regarding the TFT array panel, a plurality of gate lines 121 including a plurality of gate electrodes 123 and a plurality of storage electrode lines 131 including a plurality of storage electrodes 133a-133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181 184 and 185 are provided at the passivation layer 180 and the gate insulating layer 140, and a plurality of pixel electrodes 190 and a plurality of storage connections 91 are formed on the passivation layer 180. An alignment layer 11 is coated on an inner surface of the TFT array panel 100, and a polarizer 12 is disposed on an outer surface of the TFT array panel 100.

Regarding the common electrode panel, a light blocking member 220, a plurality of color filters 230, an overcoat 250, and a common electrode 270 are formed on an insulating substrate 210. An alignment layer 21 is coated on an inner surface of the common electrode panel 100, and a polarizer 22 is disposed on an outer surface of the common electrode panel 100.

Different from the LCD shown in FIGS. 1-4, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

In addition, there is no storage electrode connecting the storage electrodes 133a and 133b.

Each pixel electrode 190 is chamfered at its left corners but not chamfered at its right corners and the chamfered edges of the pixel electrode 190 make an angle of about 45 degrees with the gate lines 121.

Each pixel electrode 190 has a plurality of lower cutouts 191-193, upper cutouts 196-198, and center cutouts 194 and 195, which partition the pixel electrode 190 into a plurality of partitions. The lower and the upper cutouts 191-193 and 196-198 are disposed at lower and upper halves of the pixel electrode 190, respectively, and the center cutouts 194 and 195 is located between the lower cutouts 191-193 and the upper cutouts 196-198. The cutouts 191-198 substantially have an inversion symmetry with respect to a transverse center line of the pixel electrode 190 that divides the lower and the upper halves of the pixel electrode 190.

The lower and the upper cutouts 191-193 and 196-198 make an angle of about 45 degrees to the gate lines 121, and the lower cutouts 191-193, which extend substantially parallel to each other and to the chamfered lower edge of the pixel electrode 190, extend substantially perpendicular to the upper cutouts 196-198, which extend substantially parallel to each other and to the chamfered upper edge of the pixel electrode 190.

The cutouts 191 and 198 extend approximately from a left longitudinal edge of the pixel electrode 190 approximately to transverse edges of the pixel electrode 190. The cutouts 192 and 197 extend approximately from the left edge of the pixel electrode 190 approximately to the unchamfered right corners of the pixel electrode 190. The cutouts 193 and 196 extend approximately from left corners of the upper and lower halves of the pixel electrode 190 approximately to a right longitudinal edge of the pixel electrode 190.

The center cutout 194 includes a transverse portion extending along the transverse center line of the pixel electrode 190 and a pair of oblique portions extending from the transverse portion to the right edge of the pixel electrode 190 and extending substantially parallel to the lower cutouts 191-193 and the upper cutouts 196-198, respectively. The center cutout 195 extends along the transverse center line of the pixel electrode 190 and has an inlet from the right edge of the pixel electrode 190, which has a pair of inclined edges substantially parallel to the lower cutouts 191-193 and the upper cutouts 196-198, respectively.

Accordingly, the lower half of the pixel electrode 190 is partitioned into five lower partitions by the lower cutouts 191-193 and the center cutout 194 and the upper half of the pixel electrode 190 is also partitioned into five upper partitions by the upper cutouts 196-198 and the center cutout 194.

The common electrode 270 has a plurality of sets of cutouts 271-278 and a plurality of openings 279.

A set of cutouts 271-278 face a pixel electrode 190 and include a plurality of lower and upper cutouts 271-273 and 276-278 and center cutouts 274 and 275. Each of the cutouts 271-278 is disposed between adjacent cutouts 191-198 of the pixel electrode 190 or between a cutout 191 or 198 and a chamfered edge of the pixel electrode 190. In addition, each of the cutouts 271-278 has at least an oblique portion extending parallel to the lower cutouts 191-193 or the upper cutouts 196-198 of the pixel electrode 190, and the distances between adjacent two of the cutouts 271-278 and 191-198, the oblique portions thereof, the oblique edges thereof, and the chamfered edges of the pixel electrode 190, which are parallel to each other, are substantially the same. The cutouts 271-278 substantially have an inversion symmetry with respect to a transverse center line of the pixel electrode 190.

Each of the cutouts 271, 272, 278 and 277 has an oblique portion extending approximately from a left edge of the pixel electrode 190 approximately to a lower or upper edge of the pixel electrode 190 and transverse and longitudinal portions extending from respective ends of the oblique portion along edges of the pixel electrode 190, overlapping the edges of the pixel electrode 190, and making obtuse angles with the oblique portion. Each of the cutouts 273 and 276 has an oblique portion extending approximately from the left edge of the pixel electrode 190 approximately to a right edge of the pixel electrode 190 and a pair of longitudinal portions extending from respective ends of the oblique portion along the left and the right edges of the pixel electrode 190, overlapping the left and the right edges of the pixel electrode 190, and making obtuse angles with the oblique portion. Each of the cutouts 274 and 275 has a central transverse portion extending along the transverse center line of the pixel electrode 190, a pair of oblique portions extending from the transverse portion approximately to the right edge of the pixel electrode 190 and making obtuse angles with the central transverse portion, and a pair of terminal transverse portions extending from the respective oblique portions along the right edge of the pixel electrode 190, overlapping the right edge of the pixel electrode 190, and making an obtuse angle with the respective oblique portions.

Each opening 279 extends along a data line 171 to overlap the data line 171 and it is disposed between adjacent sets of the cutouts 271-278. Some openings 279 meet the gate lines 121 while the other openings 279 do not meet the gate lines 121. The number of the openings 279 that are disposed between adjacent two gate lines 121 is three.

The contact holes 182 and 183 and the contact assistants 95 and 97 shown in FIGS. 1-4 can be omitted when driving circuits for applying signals to the gate lines 121 or the data lines 171 are formed on the TFT panel 100 along with the TFTs.

A manufacturing method of the TFT array panel according to an embodiment simultaneously forms the data lines 171, the drain electrodes 175, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171 and the drain electrodes 175 and the second portions are located on channel areas of TFTs.

The position-dependent thickness of the photoresist is obtained by several techniques, for example, by providing translucent areas on the exposure mask 300 as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-4 may be appropriate to the LCD shown in FIGS. 5 and 6.

As described above, the openings 279 reduce the delay of the data voltages flowing in the data lines 171, which is generated by the parasitic capacitance formed by the overlap of the common electrode 270 and the data lines 171. The openings 270 also decrease the variation of the capacitance of the liquid crystal capacitor due to the data voltages carried by the data lines 171 and lateral light leakage due to the crosstalk of the data signals. The reduction of the lateral light leakage enables to decrease the width of the light blocking member 220, thereby increasing the aperture ratio.

While the present invention has been described in detail with reference to the preferred embodiments, those skilled in the art will appreciate that various modifications and substitutions can be made thereto without departing from the spirit and scope of the present invention as set forth in the appended claims.

For example, the arrangements of the cutouts and the openings of the pixel electrodes and the common electrode may be modified and protrusions are provided instead of the cutouts.

What is claimed is:

1. A liquid crystal display comprising:
   a first substrate;
   a gate line formed on the first substrate;
   a gate insulating layer formed on the gate line;
   a semiconductor formed on the gate insulating layer;
   a data line formed on the gate insulating layer and intersecting the gate line;
   a drain electrode formed on the semiconductor at least in part;
   a pixel electrode connected to the drain electrode and having a first domain defining member,
   a second substrate facing the first substrate; and
   a common electrode formed on the second substrate and having a second domain defining member facing the pixel electrode and a first opening separated from the second domain defining member,
   wherein the entire length of the first opening overlaps the gate line or the data line.

2. The liquid crystal display of claim 1,
   wherein the common electrode further has a second opening separated from the first opening along the gate line or the data line.

3. The liquid crystal display of claim 2,
wherein the first domain defining member includes a first cutout provided at the pixel electrode and the second domain defining member includes a second cutout provided at the common electrode, and
the second cutout is disposed between adjacent the first cutouts.

4. The liquid crystal display of claim 3, wherein distances between the second cutout and the first and the second openings and between the first opening and the second opening range from about three to six microns.

5. The liquid crystal display of claim 1, further comprising a storage electrode line located on the same plane as the gate line and overlapping the pixel electrode.

6. The liquid crystal display of claim 1, wherein the semiconductor has substantially the same planar shape as the data line and the drain electrode except for a portion disposed between the data line and the drain electrode.

7. A liquid crystal display comprising a first pixel area and a second pixel area adjacent to the first pixel area comprising:
a first pixel electrode disposed in the first pixel area,
a second pixel electrode disposed in the second pixel area,
a common electrode disposed in the first pixel area and the second pixel area and facing the first pixel electrode and the second pixel electrode, and
a signal line disposed between the first pixel area and the second pixel area,
wherein the common electrode has a first opening extending along the signal line and overlapping the signal line.

8. The liquid crystal display of claim 7, wherein the common electrode further has a second opening separated from the first opening along the signal line.

9. The liquid crystal display of claim 8, wherein the first and the second pixel electrodes further have a first and a second domain defining member, respectively.

10. The liquid crystal display of claim 9, wherein the first domain defining member includes a first cutout provided at the first pixel electrode and the second domain defining member includes a second cutout provided at the second pixel electrode.

11. The liquid crystal display of claim 10, wherein the first and the second openings are disposed between the first cutout and the second cutout.

12. The liquid crystal display of claim 10, wherein the common electrode further has a third domain defining member separated from the first and the second openings.

* * * * *